Patented Aug. 5, 1924.

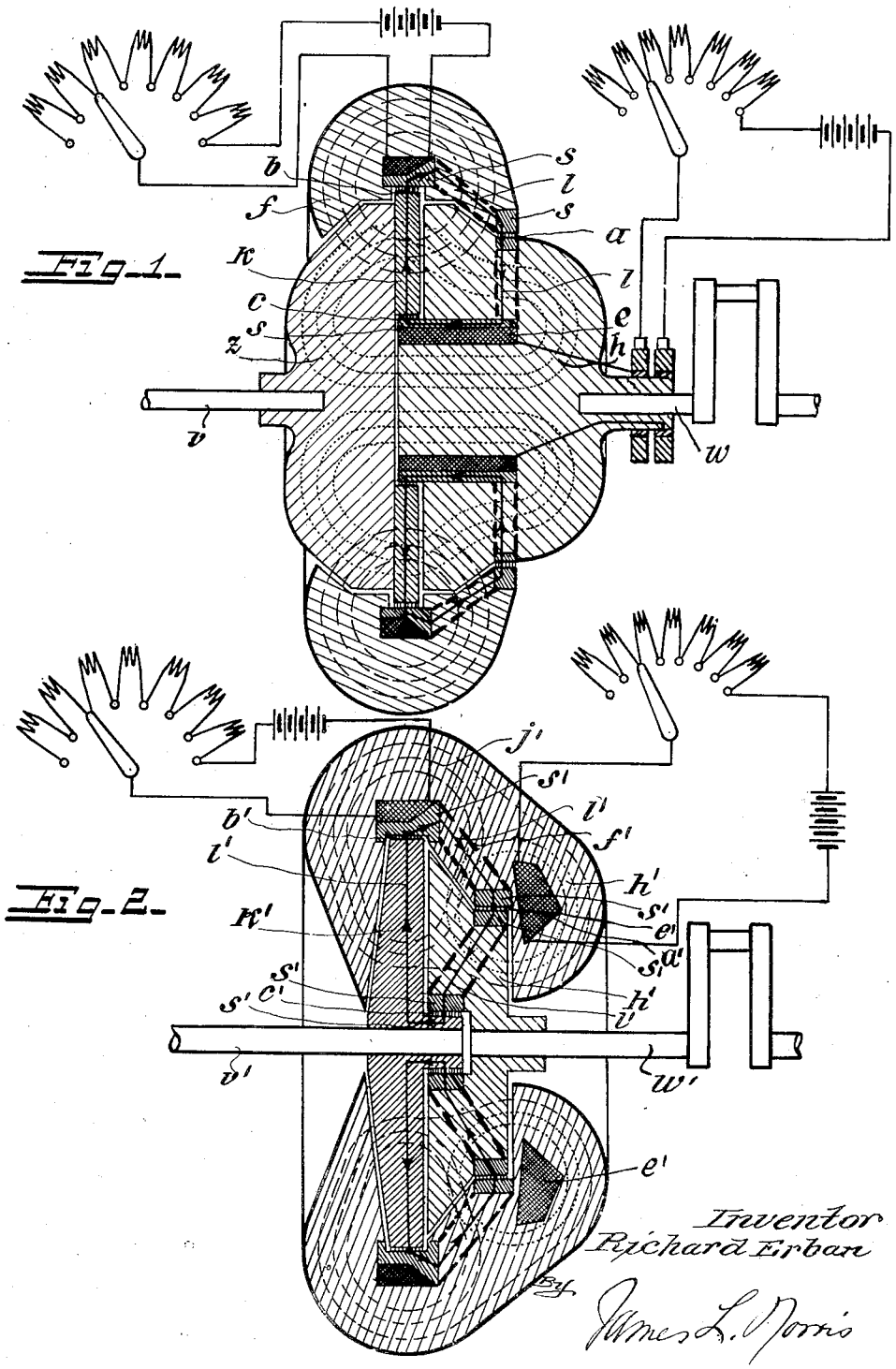

1,504,109

UNITED STATES PATENT OFFICE.

RICHARD ERBAN, OF VIENNA, AUSTRIA.

MAGNETO-ELECTRIC COUPLING.

Application filed October 26, 1920. Serial No. 419,711.

(GRANTED UNDER THE PROVISIONS OF THE ACT OF MARCH 3, 1921, 41 STAT. L., 1313.)

*To all whom it may concern:*

Be it known that I, RICHARD ERBAN, a citizen of the Republic of Austria, residing at Vienna IV, Wiedner Gurtel 52, Austria, have invented certain new and useful Improvements in Magneto-Electric Couplings, of which the following is a specification.

This invention has reference to a magneto-electric coupling particularly suitable for use on motor vehicles. The object of the invention is to provide a magneto-electric coupling adapted to permit a gradual and shockless starting and stopping, and also a shockless regulation of the rotary speed and a reversal in the direction of the rotary motion of the coupling.

The arrangement according to this invention is differentiated from the known magneto-electric couplings and variable speed gears in that only the mechanical energy, which corresponds with the slip, is transformed into electrical energy, and with the aid of an adjustable auxiliary field superposed upon the main field, is transformed again into useful mechanical rotary energy in the same conductor. This means an essential diminution in the weight of the coupling and a considerable improvement of the efficiency over the known arrangements.

Figs. 1 and 2 of the accompanying drawing illustrate in longitudinal sections two constructions of coupling according to the invention.

The arrangement illustrated in Fig. 1 comprises a magnet body $h$ with exciter winding $e$ which tends to rotate a conductor $k$ by means of electrical currents induced through the rotation of the driving shaft $w$ and the magnet $h$; the circuit for the currents being completed by slip rings $s$, $s$ and by contact pieces brushes or other bridge members $a$, $b$ and $c$.

The course of the magnetic field is indicated in dotted lines and the current flow by arrows. To reduce the resistance offered to the course of the current, conductors $l$ located in the iron and connected to the collector rings $s$, $s$ may be provided. In the embodiment illustrated in Fig. 1, the completion of the lines of force of the magnet $h$ is accomplished by an iron body $z$, to which the disc-like conductor $k$ is rigidly connected.

The field of a fixed and immovable magnet $f$ which may be regulated by means of an electric current is superposed upon the field of the main magnet $h$. If on the rotation of the main magnet $h$ or of the body $z$, with the conductor $k$, the lines of force of the field of the auxiliary magnet $f$ transect the conductor $k$ in the same direction as the field of the main magnet $h$, the field of the auxiliary magnet $f$ will produce in the conductor $k$ an electromotive force which is opposed to the electromotive force produced in the same conductor $k$ by the relative motion between the magnet $h$ and the driven shaft $v$. The difference between the two electromotive forces produces in the closed conductor $k$ a current, which together with the two fields of the magnets $h$ and $f$ furnishes the driven shaft $v$ with rotary moments acting in the same direction. The rotary moment produced by the magnet $h$ corresponds to that of an ordinary slip coupling, whilst the second rotary moment corresponds to the rotary moment of an electric motor.

From the aforesaid it is clear that the relative rotary motion between the driving and driven shaft $w$ and $v$ may be adjusted gradually and without shock by the regulation of one or both fields of the magnets $h$ and $f$. It follows that the arrangement may also be employed for the reversal of the rotation of the driven shaft $v$, by reversing one of the fields of the magnets. For instance if the field of the magnet $f$ is reversed, such field $f$ will induce an electromotive force of the same direction as the electromotive force induced by the field $h$. Thus the intensity of the current flowing through the conductor $k$ is greatly increased. The rotary moment thus produced by the action of the current induced by the field $f$ will, however, have a reverse direction as compared with that produced by the field $h$. The speed of rotation therefore decreases with the intensity with which the field $f$ is excited as two rotary moments of opposite direction are produced. If the intensity of the magnetic field still increases, then the rotary moment produced by this field will at least be superior to that produced by the field $h$, in consequence of which the direction of rotation will be reversed as the resultant rotary moment will then have a direction opposite to its original direction of rotation.

Another construction in which a further considerable diminution of the weight can be obtained is illustrated in Fig. 2. In this construction both magnetic fields $h$ and $f$ of Fig. 1 are united in a common fixed and immovable yoke $f'$, $j'$ and bodies $h'$ and $k'$ of reduced size are connected to the driving shaft $w'$ and driven shaft $v'$, respectively. Preferably the conductor $k'$ is not a solid disc of non-magnetic material but a member consisting of ferromagnetic material and if desired is furnished with enclosed current conductors $l'$. In this instance, the exciter winding $e'$ corresponds with the exciter winding $e$ in Figure 1, and the slip rings $s'$, $s'$, the brushes $a'$, $b'$ and $c'$, the driving shaft $w'$ and the driven shaft $v'$ correspond with the respective parts shown in Figure 1 and described in connection therewith. In each form of the invention shown, the body connected to or cooperative with the driven shaft embodies a conductor which is subject to the joint and simultaneous action of the fields produced by the stationary body and the body connected to or cooperative with the driving shaft, thus giving rise to a resultant current which will then produce the torque required.

What I claim is:

1. In an electromagnetic coupling, the combination of a body of magnetic material cooperative with a driving shaft, means to produce a magnetic field in said body, a stationary body of magnetic material, means to produce a second magnetic field therein, an electric circuit through said bodies, and a conductor forming part of said circuit cooperative with a driven shaft, the said conductor being arranged so as to be exposed to the joint and simultaneous action of both magnetic fields.

2. In an electromagnetic coupling, the combination of a body of magnetic material connected to a driving shaft, means to produce a magnetic field in the body, a stationary body of magnetic material, means to produce a second magnetic field in said stationary body, a body of magnetic material connected to a driven shaft, and a closed electric circuit through said bodies, the body connected with the driven shaft embodying a conductor which forms part of said circuit, the said conductor being arranged between both fields so as to be exposed to the joint and simultaneous action of both magnetic fields.

3. In an electromagnetic coupling, the combination of a body of magnetic material cooperative with a driving shaft, means to produce a magnetic field in said body, a stationary body of magnetic material, means to produce a second magnetic field therein, a body of magnetic material cooperative with a driven shaft, in close proximity to the other bodies and adapted to close the magnetic circuits of both fields, and a closed electric circuit through all bodies, the body cooperative with the driven shaft embodying a conductor which forms part of said electric circuit and is positioned within the path of both magnetic fields, the said conductor being arranged so as to be subjected to the joint and simultaneous inductive action of the same.

4. In an electromagnetic coupling, the combination of a body of magnetic material connected to a driving shaft, an energizing coil to produce a magnetic field therein, a stationary body of magnetic material, an energizing coil to produce a second magnetic field in said body, a body of magnetic material connected to a driven shaft in close proximity to said other bodies and arranged so as to close the magnetic circuits through both fields, the latter body embodying a conductor, and a closed electric circuit through all the bodies, including said conductor, the said conductor being positioned within the path of both magnetic fields transecting the same so as to be subjected to the joint and simultaneous action of both magnetic fields.

5. In an electromagnetic coupling, the combination of a body of magnetic material cooperative with a driving shaft, means to generate a magnetic field therein, a stationary body of magnetic material, means to produce a second magnetic field in said body, means to vary the intensity of said second magnetic field, an electric circuit through said bodies, and a conductor forming part of said circuit cooperative with a driven shaft, said conductor being positioned in the path of both magnetic fields and subjected to the joint and simultaneous action of the same.

6. In an electromagnetic coupling for connecting a driving shaft with a driven shaft, the combination of a rotating body of magnetic material, cooperative with the driving shaft, a stationary body of magnetic material, an electric circuit which includes a conductor cooperative with said driven shaft, means to produce a magnetic field in the rotating body, said field transecting said conductor, and means to produce a second magnetic field in the stationary body transecting the conductor simultaneously and acting conjointly with the first field on the same.

7. In an electromagnetic coupling for connecting a driving shaft with a driven shaft, the combination of a rotating body of magnetic material connected to rotate with the driving shaft, means to produce a magnetic field in said body, an electric circuit comprising a conductor connected to rotate with the driven shaft in operative position with respect to the said body to produce an electric slip coupling between said rotating body and the conductor, a stationary body in proximity to said conductor, means to generate an electric field therein, cutting said conductor, and producing an electromotoric rotary moment between the said stationary body and the conductor, the said conductor being so positioned as to be simultaneously subjected to both field actions, so as to cause the rotary moment due to the said electro-motoric action to combine with the rotary moment produced in the slip coupling.

8. In an electromagnetic coupling for connecting a driving shaft with a driven shaft, the combination of a rotating body of magnetic material connected to the driving shaft, means to produce a magnetic field in said body, an electric circuit comprising a conductor connected to the driven shaft, a stationary body in proximity to said conductor, means to produce a magnetic field in said stationary body, the said magnetic field transecting the conductor and producing an electro-motoric torque therein, means to vary the intensity of the magnetic field, and means to subject the said conductor to the joint and simultaneous action of the magnetic field produced in the rotating body associated with the driving shaft.

9. In an electromagnetic coupling for connecting a driving shaft with a driven shaft, the combination of a rotating body of magnetic material connected to the driving shaft, an energizing coil to generate a magnetic field therein, means for varying the energization of said coil, a second body connected to the driven shaft and positioned so as to be transected by the field generated, said second body embodying a conductor which is transected by the field entering into said second body, means including said conductor for producing an electric slip coupling between said bodies, a stationary body of magnetic material, an energizing coil therein to generate a magnetic field, means for varying the intensity of said magnetic field, the said stationary body being arranged in an operative position with respect to the body connected to the driven shaft, so that the magnetic field generated is transected by said body and the conductor embodied therein to produce a torque between the stationary body and the body connected to the driven shaft, and means to subject the conductor to the simultaneous and joint fluxes of both magnetic fields so as to combine the rotary moments of the slip coupling with said torque.

10. In an electromagnetic coupling for connecting the driving shaft with the driven shaft, the combination of a rotating body of magnetic material cooperative with the driving shaft, an energizing coil in proximity thereto to generate a magnetic field therein, a second body transected by the lines of force of said magnetic field, said second body being cooperative with the driven shaft and embodying a conductor a third stationary body of magnetic material, an energizating coil to create a magnetic field therein, means for varying the energization of said coil, said conductor being positioned in the path of both magnetic fields and subjected to the simultaneous and joint fluxes of both of said magnet fields, a closed electric circuit the parts of which are positioned in all three bodies, slip rings and contact members to establish a permanent connection between all the parts of said circuit, said circuit including the conductor subjected to the joint fluxes of the magnetic fields.

11. In an electro-magnetic coupling for connecting a driving shaft with a driven shaft, the combination of a rotating body of magnetic material connected to rotate with the driving shaft, a body of magnetic material connected to rotate with the driven shaft and embodying a conductor, a stationary yoke body enveloping both rotating bodies, means positioned in said yoke body for generating a stationary magnetic field, means positioned in said yoke body for generating a second magnetic field, said conductor being arranged in proximity to both magnetic fields so that it is subjected to the joint fluxes of both, and means for varying the strength of said fluxes.

12. In an electromagnetic coupling for connecting a driving shaft with a driven shaft, the combination of a rotating body of magnetic material connected to the driving shaft, a second body of magnetic material embodying a conductor and connected to the driven shaft, a stationary yoke body enveloping both rotating bodies, an electric circuit traversing all three of said bodies, the conductor of the body connected to the driven shaft forming part of said circuit, means to create a magnetic field in the rotating body connected to the driving shaft, means to create a second magnetic field, both means being positioned in the yoke body, the rotating body connected to the driven shaft being arranged within both fields, the conductor of said body being located in that part of such body which is transected by both fields jointly and thereby subjected to the joint fluxes of both fields, and means for varying the strength of the said fluxes.

In testimony whereof I have hereunto set my hand.

RICHARD ERBAN.

Witnesses:
 ELIZABETH MARIA REIFENSTUHL,
 CARL CONOTINSKY.